(No Model.)
W. A. B. BUCKLAND.
SECONDARY VOLTAIC BATTERY.
No. 556,660. Patented Mar. 17, 1896.
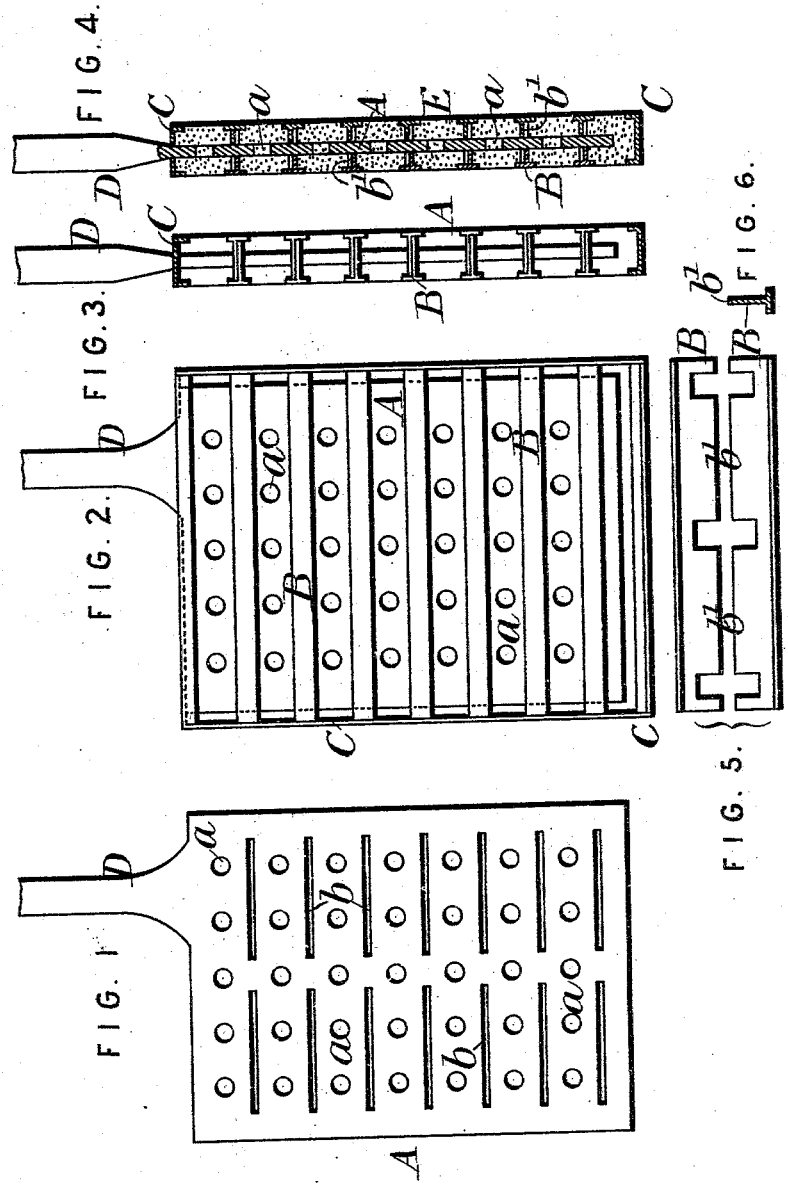
Witnesses.
Thos. A. Green
Robert Everett
Inventor.
William A. B. Buckland.
By James L. Norris.
Atty.

UNITED STATES PATENT OFFICE.

WILLIAM ALFRED BAXTER BUCKLAND, OF LONDON, ENGLAND.

SECONDARY VOLTAIC BATTERY.

SPECIFICATION forming part of Letters Patent No. 556,660, dated March 17, 1896.

Application filed July 15, 1895. Serial No. 556,056. (No model.) Patented in England July 10, 1894, No. 13,363; in France March 28, 1895, No. 245,999; in Belgium March 30, 1895, No. 114,832; in Switzerland April 8, 1895, No. 10,093; in Italy May 7, 1895, LXXV, 464; in Spain June 25, 1895, No. 17,244, and in Canada August 6, 1895, No. 49,639.

*To all whom it may concern:*

Be it known that I, WILLIAM ALFRED BAXTER BUCKLAND, a citizen of England, residing at 12 Pakenham Street, Gray's Inn Road, London, in the county of Middlesex, England, have invented an Improved Plate for Secondary Voltaic Batteries, (for which Letters Patent have been obtained in Great Britain, dated July 10, 1894, No. 13,363; in Belgium, dated March 30, 1895, No. 114,832; in France, dated March 28, 1895, No. 245,999; in Italy, dated May 7, 1895, LXXV, 464; in Switzerland, dated April 8, 1895, No. 10,093; in Spain, dated June 25, 1895, No. 17,244, and in Canada, dated August 6, 1895, No. 49,639,) of which the following is a specification.

My invention relates to the construction of a plate for secondary voltaic batteries in such a manner that the active material is held in position on the plate without exposing any of the plate to the action of the electrolyte.

I shall describe my invention, referring to the accompanying drawings.

Figure 1 is a front view of the bare plate as it is cast. Fig. 2 is a front view, and Fig. 3 is a vertical section, of it as prepared to receive the active material. Fig. 4 is a vertical section of the plate charged with the active material. Fig. 5 is a plan of a pair of the partitions, and Fig. 6 is a section of one of them.

I cast a plate A, Fig 1, preferably of an alloy of lead and antimony, a number of slots $b$ and holes $a$ being formed either in casting the plate or being afterward punched through it. I provide a number of pieces B of T-section of some substance, such as celluloid, ebonite, or the like, which is not attacked by the electrolyte employed in the battery and which has certain elasticity. I cut these pieces, as shown in Fig. 5, so that their projecting parts $b'$ can be inserted from opposite sides of the plate into the slots $b$ and held therein by cementing the piece inserted from the one side onto the piece inserted from the other side. I also provide a frame C, of celluloid or like material, completely surrounding the plate A, except where its conducting-limb D passes up through the frame. Having thus provided on both sides of the plate a number of compartments separated by the partitions B and terminated by the sides of the frame C, I charge these with active material E, the layers of which on the one side communicate with those on the other side through the holes $a$.

Having thus described the nature of my said invention and the best means I know for carrying the same into practical effect, I claim—

1. A perforated plate for a secondary voltaic battery having slots $b$ and provided with a surrounding frame C, a plurality of T-shaped sections B arranged at opposite sides of the plate and having their projecting parts engaging the said slots to form a plurality of compartments at each side of the plate which are charged with active material, the material in the compartments at one side of the plate communicating with the material in the compartments at the opposite side of the plate through the perforations in said plate, and said active material being held in place by the surrounding frame and by the said T-shaped sections, substantially as described.

2. A perforated plate for a secondary voltaic battery provided with a surrounding frame C of celluloid, a plurality of T-shaped sections B arranged at opposite sides of the plate and having their projecting parts engaged therewith to form a series of compartments at each side of the plate which are charged with active material, the material in the compartments at one side of the plate communicating with the material in the compartments at the opposite side of the plate through the perforations in said plate, and said active material being held in place by the said frame and said T-shaped sections, substantially as described.

In testimony whereof I have signed my name to this specification, in the presence of two subscribing witnesses, this 4th day of July, A. D. 1895.

WILLIAM ALFRED BAXTER BUCKLAND.

Witnesses:
OLIVER IMRAY,
JNO. P. M. MILLARD.